US011950152B2

(12) United States Patent
Movva et al.

(10) Patent No.: US 11,950,152 B2
(45) Date of Patent: Apr. 2, 2024

(54) ROBUST MEASUREMENT PROCEDURE FOR NEIGHBOR BASE STATION (BS) HANDOFF CANDIDATES IN A WIRELESS WIDE AREA NETWORK (WWAN)

(71) Applicant: QUALCOMM Incorporated, San Diego, CA (US)

(72) Inventors: Raghu Babu Movva, Hyderabad (IN); Subrahmanyam Vuddagiri, Tanuku (IN); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/175,502

(22) Filed: Feb. 12, 2021

(65) Prior Publication Data
US 2022/0264395 A1 Aug. 18, 2022

(51) Int. Cl.
*H04W 36/00* (2009.01)
*H04B 17/318* (2015.01)
*H04W 36/08* (2009.01)

(52) U.S. Cl.
CPC ...... *H04W 36/0085* (2018.08); *H04B 17/318* (2015.01); *H04W 36/0069* (2018.08); *H04W 36/08* (2013.01)

(58) Field of Classification Search
CPC ......... H04W 36/0085; H04W 36/0069; H04W 36/08; H04W 36/00692; H04W 36/00695;
(Continued)

(56) References Cited

U.S. PATENT DOCUMENTS 9,237,493 B2 1/2016 Kanamarlapudi et al.
10,779,180 B2 9/2020 Kim et al.
(Continued)

FOREIGN PATENT DOCUMENTS

CN 111818595 A 10/2020
CN 111885658 A 11/2020
WO WO-2020222144 A1 11/2020

OTHER PUBLICATIONS

Intel Corporation: "Report of [AT109e] [212] [MOB] CHO Configuration and Execution Details (Intel)", 3GPP Draft, 3GPP TSG-RAN WG2 Meeting #109 electronic, R2-2001728, 3rd Generation Partnership Project (3GPP), Mobile Competence Centre, 650, Route Des Lucioles, F-06921 Sophia-Antipolis Cedex, France, vol. RAN WG2, No. Elbonia, Feb. 24, 2020-Mar. 6, 2020, Mar. 11, 2020 (Mar. 11, 2020), XP051864472, 43 Pages, Retrieved from the Internet: URL: https://ftp.3gpp.org/tsg_ran/WG2_RL2/TSGR2_109_e/Docs/R2-2001728.zip R2-2001728 Report of [AT109e] [212] [MOB]-V3.docx [Retrieved on Mar. 11, 2020] p. 3, line 1-p. 7, line 3.
(Continued)

*Primary Examiner* — Chi H Pham
*Assistant Examiner* — Ji-Hae Yea
(74) *Attorney, Agent, or Firm* — Arun Swain

(57) ABSTRACT

This disclosure provides systems, methods, and apparatus, including computer programs encoded on computer-readable media, for implementing a robust measurement procedure for neighbor base stations (BSs) that are handoff candidates. In some aspects, a user equipment (UE) may designate a first 5G New Radio (NR) neighbor BS as a handoff candidate for the UE based on a first signal strength measurement. The UE may configure a measurement time interval to perform one or more additional signal strength measurements prior to expiration of a time to trigger (TTT) time period. The UE may determine the measurement time interval based on a duration of the TTT time period config-
(Continued)

ured by a serving BS and a number of additional signal strength measurements. The UE may transmit a measurement report to the serving BS after performing the last signal strength measurement and prior to expiration of the TTT time period.

30 Claims, 9 Drawing Sheets

(58) Field of Classification Search
CPC ......... H04W 36/00698; H04W 36/083; H04W 36/085; H04W 36/087; H04W 36/13; H04B 17/318; H04B 17/328
See application file for complete search history.

(56) References Cited

U.S. PATENT DOCUMENTS

| | | | |
|---|---|---|---|
| 2003/0081657 A1* | 5/2003 | Ranta | H04B 17/27 375/147 |
| 2014/0349653 A1* | 11/2014 | Kanamarlapudi | H04W 36/36 455/437 |
| 2020/0351735 A1* | 11/2020 | Latheef | H04W 36/0085 |
| 2022/0225121 A1* | 7/2022 | Wanuga | H04L 5/0048 |

OTHER PUBLICATIONS

Partial International Search Report—PCT/US2022/015119—ISA/EPO—dated May 18, 2022 (208427WO).
International Search Report and Written Opinion—PCT/US2022/015119—ISA/EPO—dated Aug. 12, 2022 (208427WO).

* cited by examiner

ROBUST MEASUREMENT PROCEDURE FOR NEIGHBOR BASE STATION (BS) HANDOFF CANDIDATES IN A WIRELESS WIDE AREA NETWORK (WWAN)

TECHNICAL FIELD

Aspects of the present disclosure relate generally to wireless communication and to techniques for managing a measurement procedure for neighbor base station (BS) handoff candidates in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a user equipment (UE). The method may include designating a first 5G New Radio (NR) neighbor base station (BS) as a handoff candidate for the UE based, at least in part, on a first signal strength measurement, and configuring a measurement time interval to perform one or more additional signal strength measurements prior to expiration of a time to trigger (TTT) time period. The TTT time period may be configured by a serving BS. The method may include outputting a measurement report for transmission to the serving BS prior to expiration of the TTT time period.

In some implementations, the method may include determining the measurement time interval to perform the one or more additional signal strength measurements prior to expiration of the TTT time period based, at least in part, on a duration of the TTT time period and a number of additional signal strength measurements.

In some implementations, the method may include determining the number of additional signal strength measurements based, at least in part, on whether the UE is stationary or the UE is in motion.

In some implementations, the method may include configuring the number of additional signal strength measurements to one additional signal strength measurement in response to determining the UE is stationary. The method may include configuring the number of additional signal strength measurements to two or more additional signal strength measurements in response to determining the UE is in motion.

In some implementations, the method of outputting the measurement report for transmission to the serving BS prior to expiration of the TTT time period may include performing a last signal strength measurement of the one or more additional signal strength measurements and outputting the measurement report for transmission to the serving BS after performing the last signal strength measurement and prior to expiration of the TTT time period.

In some implementations, the method may include classifying each of a plurality of neighbor BSs as either a 5G NR neighbor BS or a dual connectivity neighbor BS based, at least in part, on one or more of NR acquisition database information, a system information block (SIB) message, and NR handoff history database information.

In some implementations, after classifying each of the plurality of neighbor BSs, the method may include identifying the first 5G NR neighbor BS from the plurality of neighbor BSs, performing the first signal strength measurement to determine whether the first 5G NR neighbor BS meets a signal strength criteria, and designating the first 5G NR neighbor BS as a handoff candidate for the UE in response to determining the first signal strength measurement associated with the first 5G NR neighbor BS meets the signal strength criteria.

In some implementations, after classifying each of the plurality of neighbor BSs, the method may include identifying the first 5G NR neighbor BS and a first dual connectivity neighbor BS, performing the first signal strength measurement associated with the first 5G NR neighbor BS and a second signal strength measurement associated with the serving BS, and performing the one or more additional signal strength measurements for the first 5G NR neighbor BS prior to performing additional signal strength measurements for the first dual connectivity neighbor BS in response to determining the second signal strength measurement associated with the serving BS is less than a first signal strength threshold.

In some implementations, after classifying each of the plurality of neighbor BSs, the method may include identifying the first 5G NR neighbor BS and a first dual connectivity neighbor BS, performing the first signal strength measurement associated with the first 5G NR neighbor BS and a second signal strength measurement associated with the serving BS, and performing additional signal strength measurements for the first dual connectivity neighbor BS prior to performing the one or more additional signal strength measurements for the first 5G NR neighbor BS in response to determining the second signal strength measurement associated with the serving BS is greater than a first signal strength threshold and the first signal strength measurement associated with the first 5G NR neighbor BS is less than a second signal strength threshold.

In some implementations, the first 5G NR neighbor BS may be a standalone (SA) 5G NR neighbor BS and the first dual connectivity neighbor BS may be an Evolved Universal Terrestrial Radio Access (E-UTRA) NR Dual Connectivity (EN-DC) neighbor BS.

In some implementations, the method may include determining the first signal strength measurement associated with the first 5G NR neighbor BS meets a signal strength criteria. The signal strength criteria may be configured by the serving BS. The method may include determining the one or more additional signal strength measurements associated with the first 5G NR neighbor BS meet the signal strength criteria. The measurement report may include an indication of a last signal strength measurement of the one or more additional signal strength measurements that met the signal strength criteria.

In some implementations, the signal strength criteria may be a first signal strength threshold.

Another innovative aspect of the subject matter described in this disclosure can be implemented in an apparatus of a UE for wireless communication. The apparatus may include one or more interfaces and one or more processors. The one or more processors may be configured to designate a first 5G NR neighbor BS as a handoff candidate for the UE based, at least in part, on a first signal strength measurement, and configure a measurement time interval to perform one or more additional signal strength measurements prior to expiration of a TTT time period. The TTT time period may be configured by a serving BS. The one or more interfaces may be configured to output a measurement report for transmission to the serving BS prior to expiration of the TTT time period.

In some implementations, the one or more processors may be further configured to determine the measurement time interval to perform the one or more additional signal strength measurements prior to expiration of the TTT time period based, at least in part, on a duration of the TTT time period and a number of additional signal strength measurements.

In some implementations, the one or more processors may be further configured to determine the number of additional signal strength measurements based, at least in part, on whether the UE is stationary or the UE is in motion.

In some implementations, the one or more processors may be further configured to configure the number of additional signal strength measurements to one additional signal strength measurement in response to a determination that the UE is stationary and configure the number of additional signal strength measurements to two or more additional signal strength measurements in response to a determination that the UE is in motion.

In some implementations, the one or more processors may be further configured to perform a last signal strength measurement of the one or more additional signal strength measurements. The one or more interfaces may be further configured to output the measurement report for transmission to the serving BS after performing the last signal strength measurement and prior to expiration of the TTT time period.

In some implementations, the one or more processors may be further configured to classify each of a plurality of neighbor BSs as either a 5G NR neighbor BS or a dual connectivity neighbor BS based, at least in part, on one or more of NR acquisition database information, a SIB message, and NR handoff history database information.

In some implementations, after classification of each of the plurality of neighbor BSs, the one or more processors may be further configured to identify the first 5G NR neighbor BS from the plurality of neighbor BSs, perform the first signal strength measurement to determine whether the first 5G NR neighbor BS meets a signal strength criteria, and designate the first 5G NR neighbor BS as a handoff candidate for the UE in response to determining the first signal strength measurement associated with the first 5G NR neighbor BS meets the signal strength criteria.

In some implementations, after classification of each of the plurality of neighbor BSs, the one or more processors may be further configured to identify the first 5G NR neighbor BS and a first dual connectivity neighbor BS, perform the first signal strength measurement associated with the first 5G NR neighbor BS and a second signal strength measurement associated with the serving BS, and perform the one or more additional signal strength measurements for the first 5G NR neighbor BS prior to performing additional signal strength measurements for the first dual connectivity neighbor BS in response to a determination that the second signal strength measurement associated with the serving BS is less than a first signal strength threshold.

In some implementations, after classification of each of the plurality of neighbor BSs, the one or more processors may be further configured to identify the first 5G NR neighbor BS and a first dual connectivity neighbor BS, perform the first signal strength measurement associated with the first 5G NR neighbor BS and a second signal strength measurement associated with the serving BS, and perform additional signal strength measurements for the first dual connectivity neighbor BS prior to performing the one or more additional signal strength measurements for the first 5G NR neighbor BS in response to a determination that the second signal strength measurement associated with the serving BS is greater than a first signal strength threshold and that the first signal strength measurement associated with the first 5G NR neighbor BS is less than a second signal strength threshold.

In some implementations, the one or more processors may be further configured to determine the first signal strength measurement associated with the first 5G NR neighbor BS meets a signal strength criteria. The signal strength criteria may be configured by the serving BS. The one or more processors may be further configured to determine the one or more additional signal strength measurements associated with the first 5G NR neighbor BS meet the signal strength criteria. The measurement report may include an indication of a last signal strength measurement of the one or more additional signal strength measurements that met the signal strength criteria.

Another innovative aspect of the subject matter described in this disclosure can be implemented in a non-transitory computer-readable medium having stored therein instructions which, when executed by one or more processors of a UE, cause the UE to designate a first 5G NR neighbor BS as a handoff candidate for the UE based, at least in part, on a first signal strength measurement, configure a measurement time interval to perform one or more additional signal strength measurements prior to expiration of a TTT time period, the TTT time period being configured by a serving BS, and output a measurement report for transmission to the serving BS prior to expiration of the TTT time period.

In some implementations, the instructions, when executed by the one or more processors of the UE, further cause the UE to determine the measurement time interval to perform the one or more additional signal strength measurements prior to expiration of the TTT time period based, at least in part, on a duration of the TTT time period, and a number of additional signal strength measurements.

In some implementations, the instructions, when executed by the one or more processors of the UE, further cause the UE to determine the number of additional signal strength measurements based, at least in part, on whether the UE is stationary or the UE is in motion.

In some implementations, the instructions, when executed by the one or more processors of the UE, further cause the UE to perform a last signal strength measurement of the one or more additional signal strength measurements and output the measurement report for transmission to the serving BS after performing the last signal strength measurement and prior to expiration of the TTT time period.

Another innovative aspect of the subject matter described in this disclosure can be implemented in an apparatus of a UE for wireless communication. The apparatus may include means for designating a first 5G NR neighbor BS as a handoff candidate for the UE based, at least in part, on a first signal strength measurement, and means for configuring a measurement time interval to perform one or more additional signal strength measurements prior to expiration of a time to trigger (TTT) time period. The TTT time period may be configured by a serving BS. The apparatus may include means for outputting a measurement report for transmission to the serving BS prior to expiration of the TTT time period.

In some implementations, the apparatus may include means for determining the measurement time interval to perform the one or more additional signal strength measurements prior to expiration of the TTT time period based, at least in part, on a duration of the TTT time period and a number of additional signal strength measurements.

In some implementations, the apparatus may include means for determining the number of additional signal strength measurements based, at least in part, on whether the UE is stationary or the UE is in motion.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
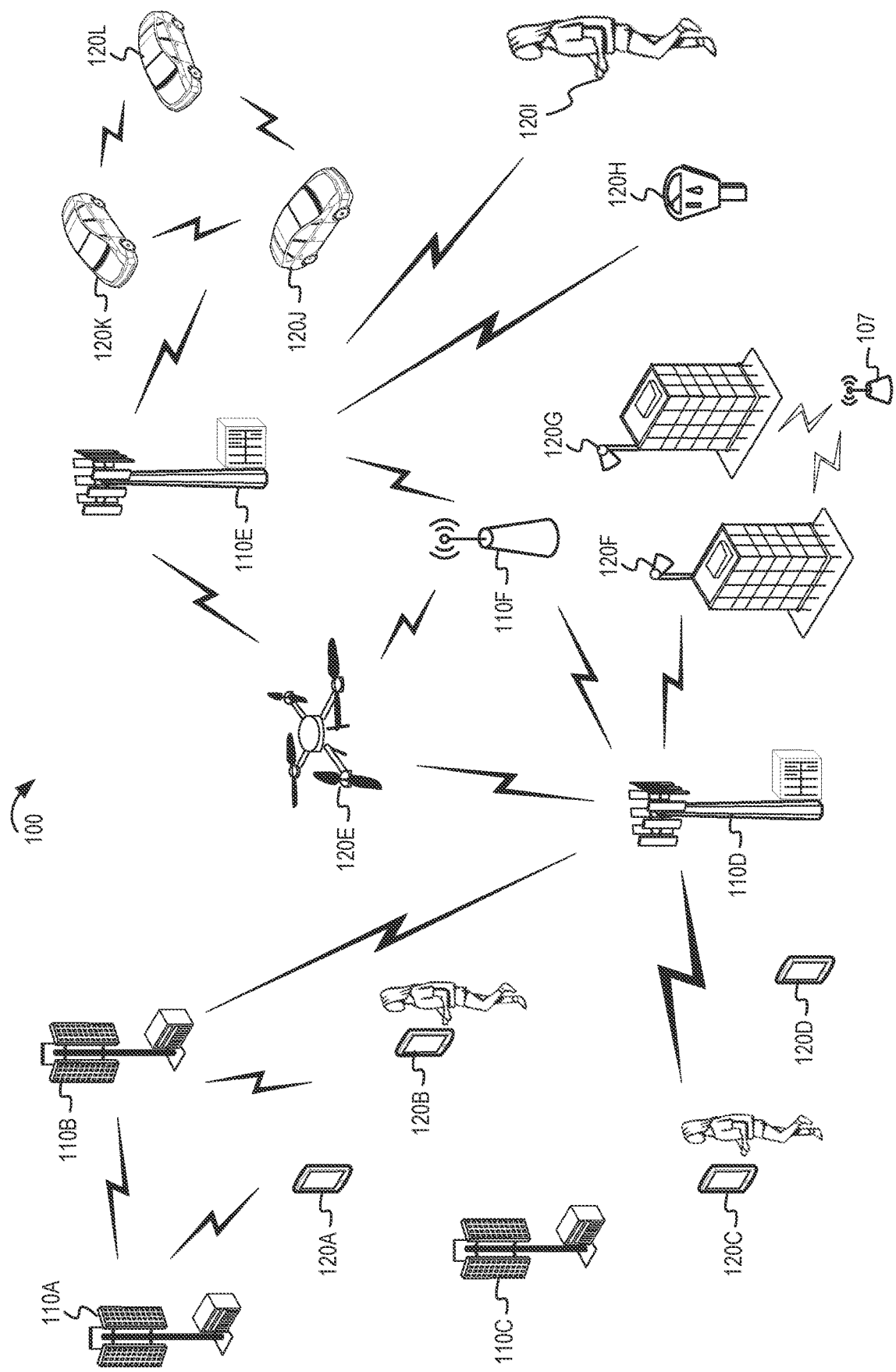
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A wireless communication network also may include BSs having a Multi-Radio Dual Connectivity (MR-DC) architecture. The MR-DC architecture may be an Evolved Universal Terrestrial Radio Access (E-UTRA) NR DC (EN-DC) architecture. The EN-DC architecture may include a first BS that implements the 5G NR RAT and a second BS that implements the LTE RAT.

A user equipment (UE) of the wireless communication network may use the 5G NR RAT, the LTE RAT, or both the 5G NR RAT and LTE NR RAT via the MR-DC architecture depending on which wireless coverage is available to the UE and which wireless coverage provides the best quality service.

As a UE traverses various areas of a WWAN, the WWAN may determine whether to perform handoffs between various BSs to maintain or improve the quality of service (QoS). Traditional measurement procedures that are used to determine whether to perform a handoff from a serving BS to a neighbor BS may include the UE performing an initial or first signal strength measurement for the neighbor BS. In one scenario, if the first signal quality measurement meets a signal strength criteria and a measurement time interval is greater than a time to trigger (TTT) time period, the UE may wait to transmit a measurement report until after the expiration of the TTT time period and without performing additional signal strength measurements. For example, if the TTT time period is 320 ms or 640 ms, but the measurement time interval (or measurement time period) is greater than the TTT time period, the UE may wait to transmit the measurement report until after the TTT time period expires (after 320 ms or 640 ms). The UE also may not perform an additional signal strength measurement prior to sending the measurement report because the measurement time interval is greater than the TTT time period.

Delaying the transmission of the measurement report until after the TTT time period expires may result in the serving BS receiving stale measurements. Also, delaying the transmission of the measurement report until after the TTT time period expires cause the handoff of the UE from the serving BS to a neighbor BS to be delayed. Further, when the measurement time interval is greater than the TTT time period, the UE may perform a single signal strength measurement before transmitting the measurement report to the serving BS. Transmitting a measurement report after performing a single measurement and after a delay in transmission of the measurement report may result in inaccurate and stale measurements. In dynamic channel conditions, such as when the UE is in motion at a high speed, when the serving BS receives stale measurements, a handoff failure may occur. For example, the handoff process may be suspended, and the data traffic may return to the serving BS instead of being handed off to the neighbor BS. In such failure conditions, the data traffic that is suspended and resumed in the serving BS may be penalized, which may affect the overall throughput and user experience.

In some implementations, the UE may classify neighbor BSs as either a 5G NR neighbor BS or a dual connectivity neighbor (such as an EN-DC neighbor BS) based on a measurement configuration message received from the serving BS and handoff history database (DB) information maintained by the UE. The measurement configuration message may include a system information block (SIB) message (such as an SIB24 message). The handoff DB information maintained by the UE may include an NR acquisition DB information and an NR handoff history DB information. After classifying the neighbor BSs, the UE may use the neighbor BS classification to determine and perform a robust signal strength measurement procedure for the neighbor BSs to aid the serving BS in performing a handoff procedure.

In some implementations, based on the classification, the UE may perform a signal strength measurement procedure for the 5G NR neighbor BSs (which also may be referred to as standalone (SA) NR neighbor BSs). For example, the UE may perform a first signal strength measurement for a first 5G NR neighbor BS. The UE may determine whether the first signal strength measurement meets a signal strength criteria. For example, the signal strength criteria may be a first signal strength threshold. If the first signal strength measurement meets the signal strength criteria, the UE may determine to perform one or more additional signal strength measurements prior to the expiration of the TTT time period. In some implementations, the UE may determine a measurement time interval (Z) to perform the one or more additional signal strength measurements prior to the expiration of the TTT time period based on a duration (T) of the TTT time period and a number (N) of additional signal strength measurements. The duration (T) of the TTT time period may be configured by the serving BS. In some implementations, the UE may determine the number (N) of additional signal strength measurements based on whether the UE is stationary or in motion. In some implementations, the UE may determine a measurement time interval (Z) by dividing the duration (T) of the TTT time period by the number (N) of additional signal strength measurements plus 1 ($Z=T/N+1$). The measurement report may be transmitted to the serving BS after the last signal strength measurement of the one or more additional signal strength measurements and prior to the expiration of the TTT time period. Whether the UE performs one additional signal strength measurement or multiple additional signal strength measurements, the measurement report may be transmitted to the serving BS prior to the expiration of the TTT time period.

In some implementations, the UE may prioritize handoffs to 5G NR neighbor BSs or handoffs to dual connectivity neighbor BSs depending on a comparison of the initial or first signal strength measurement to one or more signal strength thresholds. For example, after classification of the neighbor BSs, the UE may identify a 5G NR neighbor BS and a dual connectivity neighbor BS. The UE may perform an initial or first signal strength measurement for the 5G NR neighbor BS, may perform an initial or first signal strength measurement for the dual connectivity neighbor BS, and may perform a signal strength measurement for the serving BS. In some implementations, if the signal strength measurement associated with the serving BS is less than a first signal strength threshold, the UE may prioritize measurements associated with the 5G NR neighbor BS, which also may be referred to as an NR packet switched handover (PSHO) neighbor BS. In some implementations, if the signal strength measurement associated with the serving BS is greater than or equal to the first signal strength threshold and the initial or first signal strength measurement associated with the 5G NR neighbor BS is less than a second signal strength threshold, the UE may prioritize measurements associated with the dual connectivity neighbor BS, which also may be referred to as a non-PSHO neighbor BS.

Particular implementations of the subject matter described in this disclosure can be implemented to realize one or more of the following potential advantages. Transmitting a measurement report after the last signal strength measurement and prior to the expiration of the TTT time period may reduce the likelihood of sending stale measurements to the serving BS. Performing one or more additional measurements prior to the expiration of the TTT time period may improve the reliability and accuracy of the measurements. Using measurement configuration messages received from the serving BS and handoff history DB information maintained by the UE to classify neighbor BSs may improve the accuracy of the classification, which may further improve the measurement procedure. Providing measurements to the serving BS that are current (not stale), reliable, and accurate may prevent handover failures even in dynamic conditions, may increase throughput, and may improve the overall user experience.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

A BS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 1201 (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 1201 (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
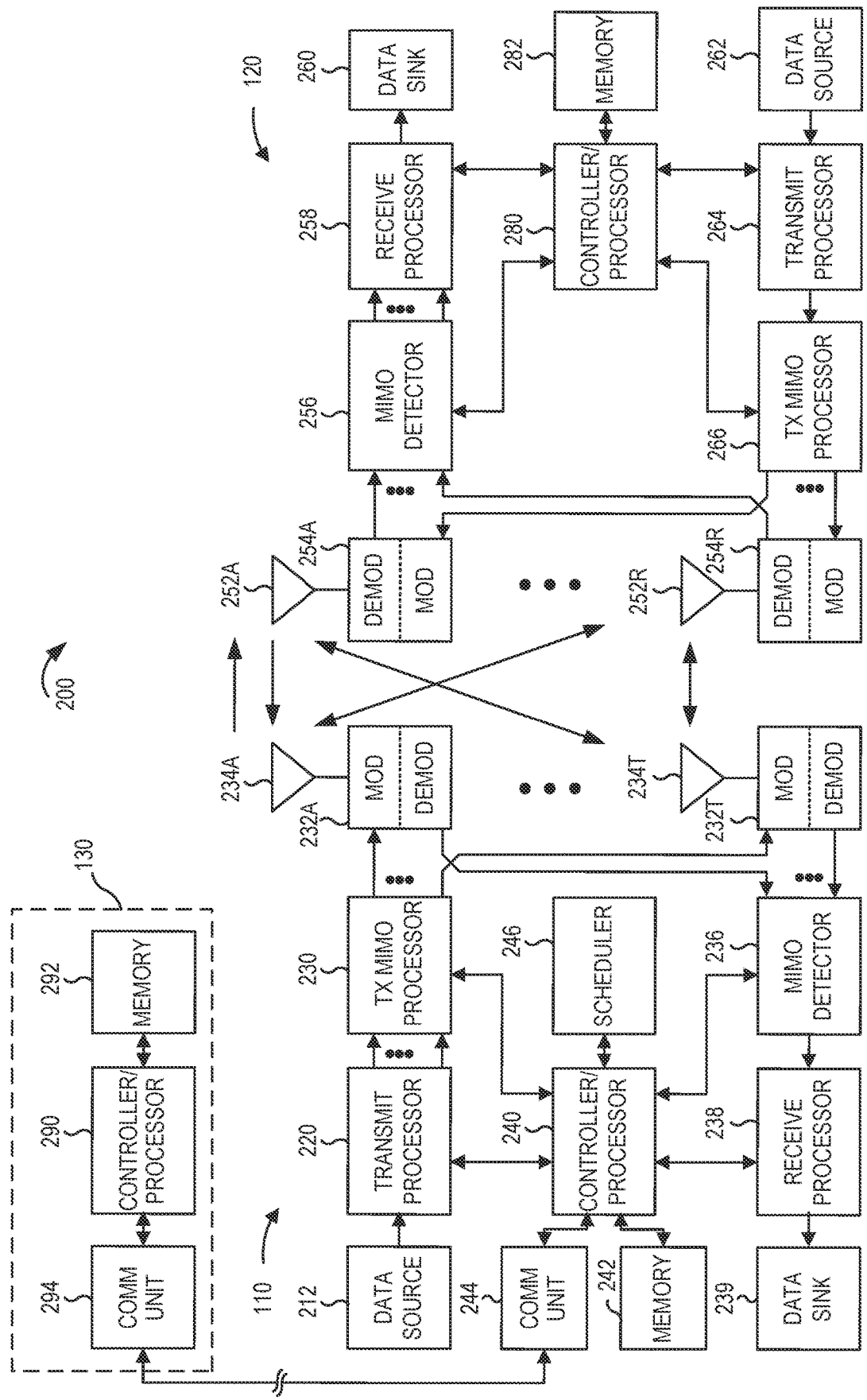
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with a robust measurement procedure for handoffs, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 700 of FIG. 7, such as the processes described in FIGS. 3-6. The memories 242 and 282 may store data and program codes for BS 110 and UE 120, respectively. A scheduler 246 may schedule UEs for data transmission on the downlink, the uplink, or a combination thereof.

Figure 5:
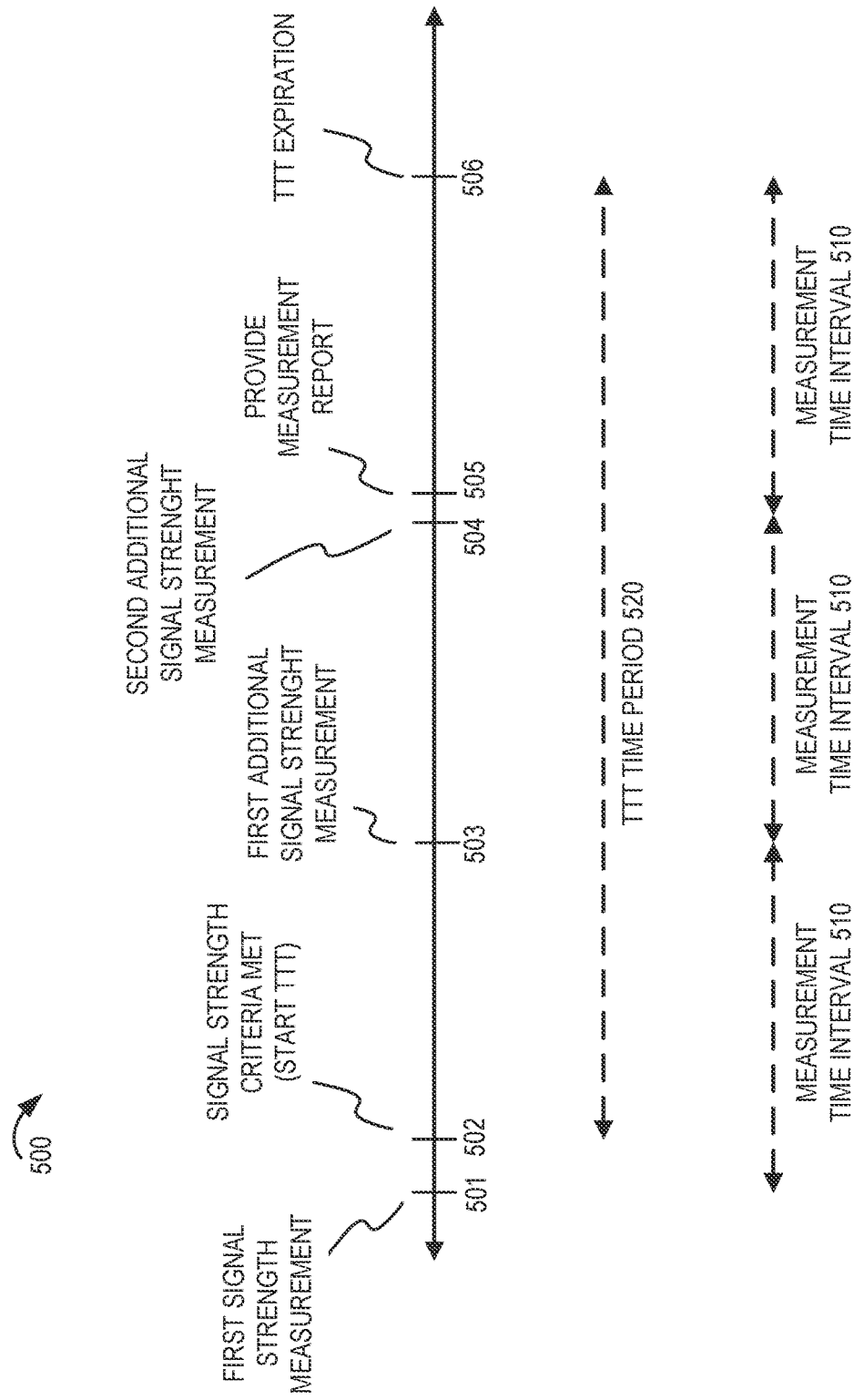
FIG. 5 shows an example timing diagram that shows how a robust measurement procedure may send a measurement report prior to the expiration of the TTT time period.
Figure 6:
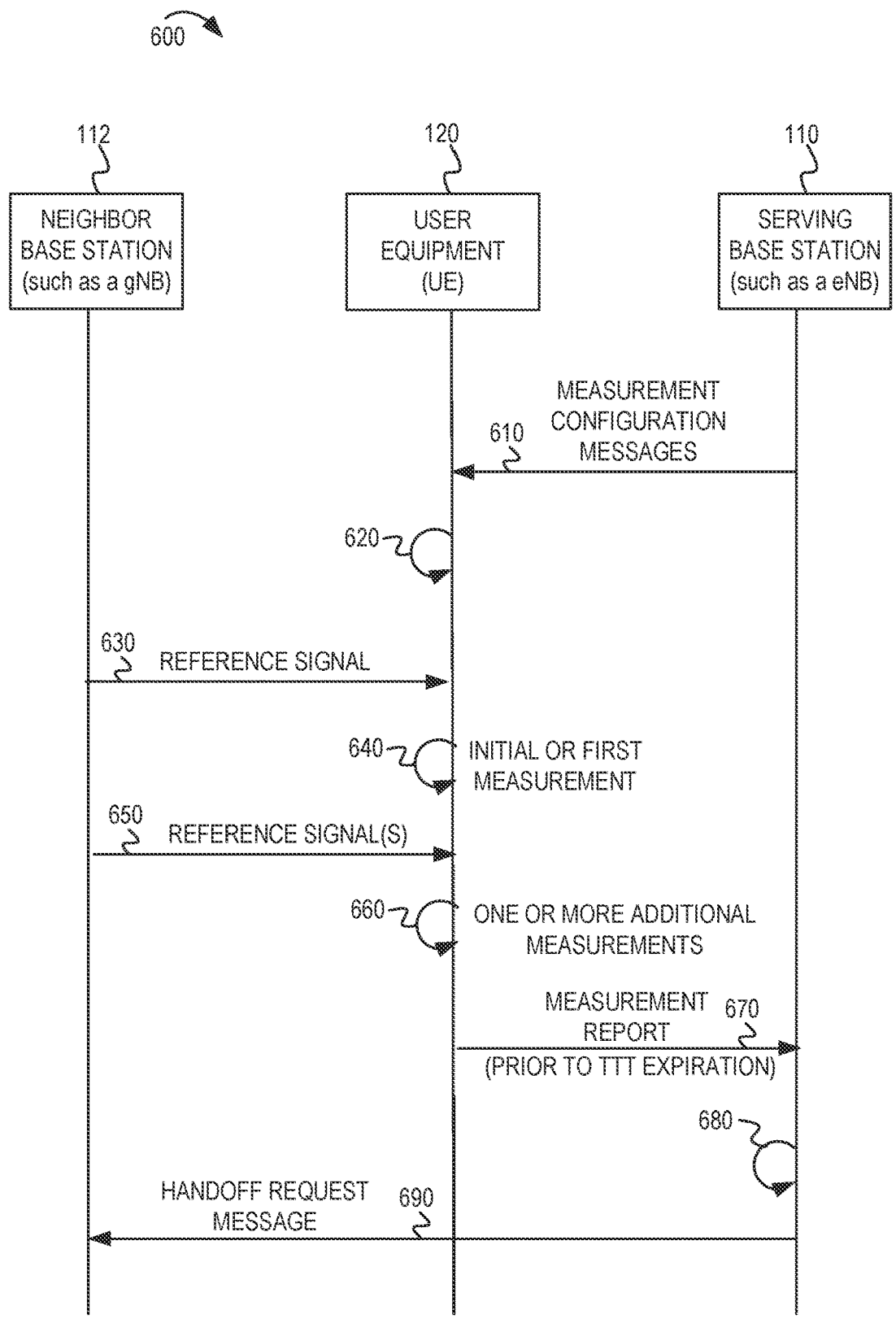
FIG. 6 shows an example message flow that shows a UE that is configured to implement a robust measurement procedure for performing handoffs.
Figure 7:
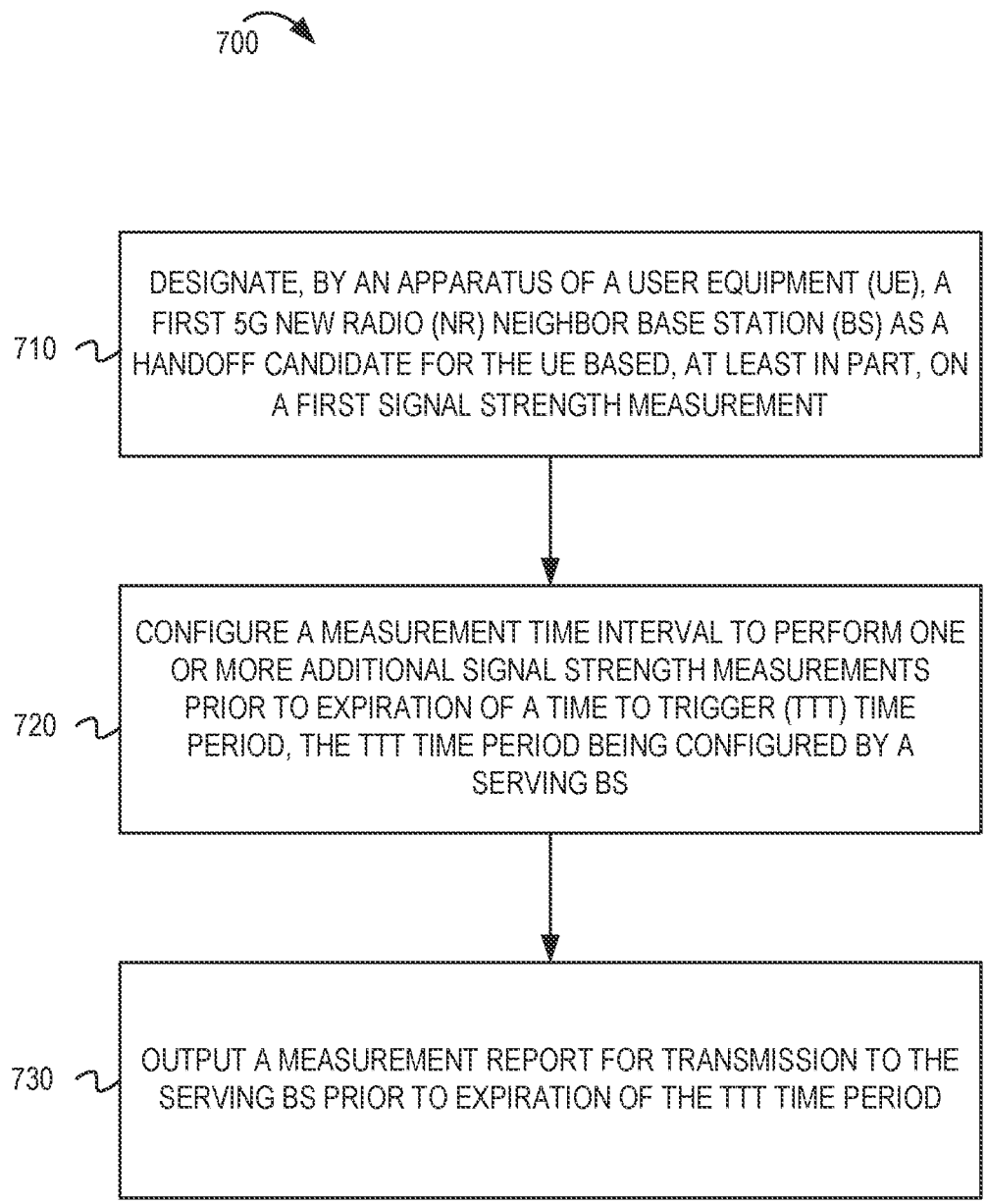
FIG. 7 shows an example flow diagram of the UE implementing a robust measurement procedure for neighbor BSs that are identified as handoff candidates.

The stored program codes, when executed by the controller/processor 280 or other processors and modules at UE 120, may cause the UE 120 to perform operations described with respect to the process depicted by flowchart 700 of FIG. 7 or other processes as described herein, such as the processes described in FIGS. 3-6. The stored program codes, when executed by the controller/processor 240 or other processors and modules at BS 110, may cause the BS 110 to perform operations described with respect to the process depicted by flowchart 700 of FIG. 7 or other processes as described herein, such as the processes described in FIGS. 3-6. A scheduler 246 may schedule UEs for data transmission on the downlink, the uplink, or a combination thereof.

In some aspects, UE 120 may include means for performing the process depicted by flowchart 700 of FIG. 7 or other processes as described herein, such as the processes described in FIGS. 3-6. In some aspects, such means may include one or more components of UE 120 described in connection with FIG. 2.

In some aspects, BS 110 may include means for performing the process depicted by flowchart 700 of FIG. 7 or other processes as described herein, such as the processes described in FIGS. 3-6. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
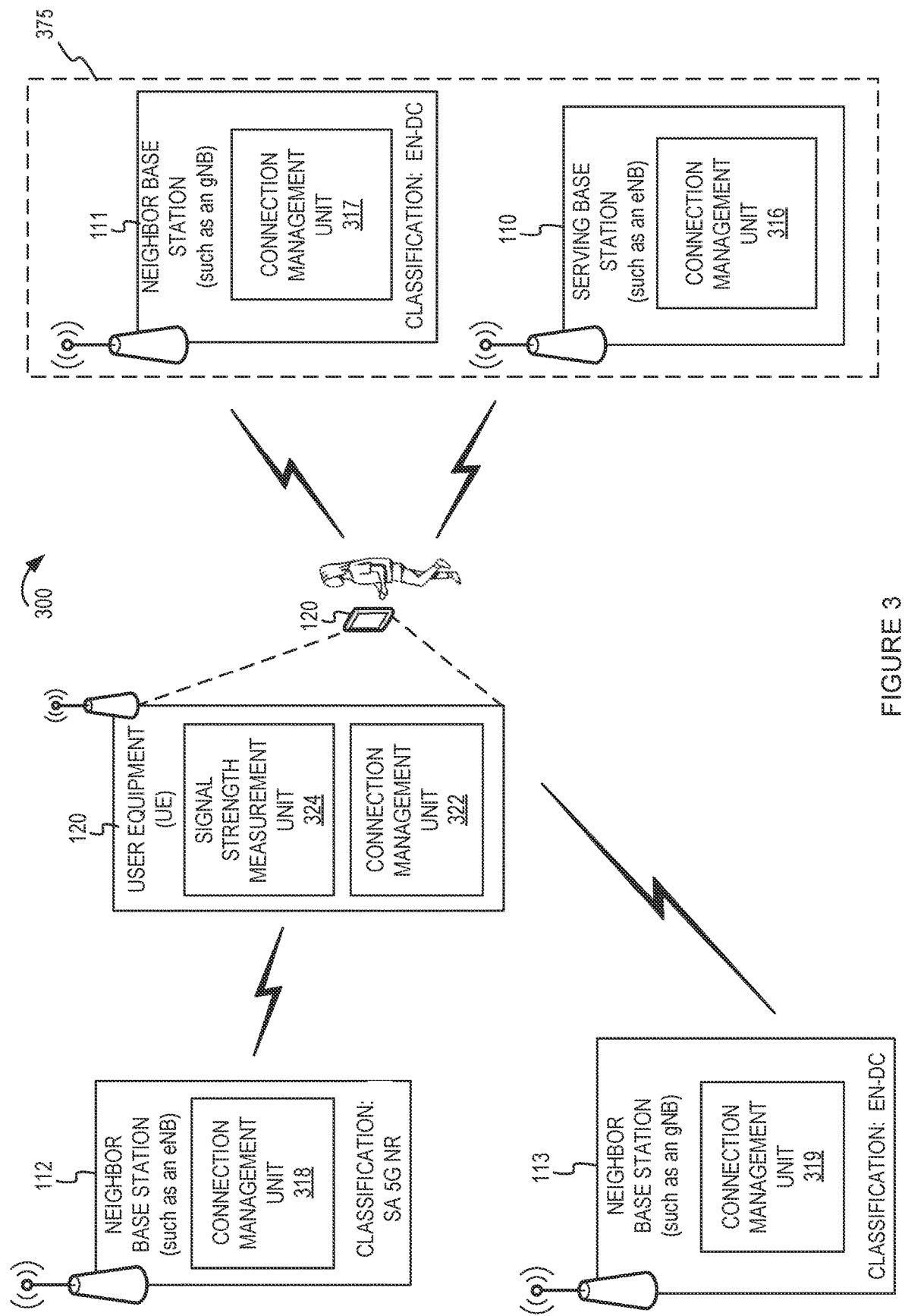
FIG. 3 shows a system diagram of an example wireless communication network including a UE that is configured to implement a robust measurement procedure for neighbor BSs that are identified as handoff candidates.

FIG. 3 shows a system diagram of an example wireless communication network including a UE 120 that is configured to implement a robust measurement procedure for neighbor BSs that are identified as handoff candidates. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication system 300 may include a UE 120, a serving BS 110, a neighbor BS 111, a neighbor BS 112, and a neighbor BS 113. In some implementations, the serving BS 110 and the neighbor BS 111 may have a Multi-Radio Dual Connectivity (MR-DC) architecture 375 and may be configured to operate in an MR-DC mode. The MR-DC mode may be an Evolved Universal Terrestrial Radio Access (E-UTRA) NR Dual Connectivity (EN-DC) mode (which also may be referred to as LTE-NR DC mode). In some implementations, the neighbor BS 113 also may be configured to operate in an MR-DC mode, such as an EN-DC mode. The neighbor BS 111 and the neighbor BS 113 may be referred to as dual connectivity neighbor BSs or EN-DC neighbor BSs. In some implementations, the neighbor BS 112 may be configured as a standalone (SA) BS and may be configured to operate in an SA mode. The neighbor BS 112 may be referred to as an SA neighbor BS or a 5G NR neighbor BS. The neighbor BS 112 may not operate in an MR-DC mode. As shown in FIG. 3, in some implementations, the serving BS 110 may be an eNB that may implement an LTE RAT and the neighbor BS 111 may be a gNB that may implement a 5G NR RAT in an MR-DC mode (such as an EN-DC mode). The neighbor BS 112 may be a gNB that may implement a 5G NR RAT in an SA mode. The neighbor BS 113 may be a gNB that may implement a 5G NR RAT in an MR-DC mode (such as an EN-DC mode). The UE 120 may be an example implementation of the UEs shown in FIGS. 1 and 2. The serving BS 110, the neighbor BS 111, the neighbor BS 112, and the neighbor BS 113 may each be an example implementation of the BSs shown in FIGS. 1 and 2. Although not shown for simplicity, the wireless communication system 300 may include one or more additional BSs and one or more additional UEs.

In some implementations, the UE 120 may include a connection management unit 322 and a signal strength management unit 324 to implement a robust measurement procedure for neighbor BSs that are identified as handoff candidates. In some implementations, the signal strength management unit 324 may determine whether an initial or first signal quality measurement associated with a neighbor BS meets a signal strength criteria. After determining the initial or first signal quality measurement meets the signal strength criteria, the signal strength management unit 324 may perform one or more additional signal strength measurements prior to the expiration of a TTT time period, as further described herein. In some implementations, the connection management unit 322 may transmit a measurement report to the serving BS after the last signal strength measurement and prior to the expiration of the TTT time period, as further described herein. In some implementations, the neighbor BS 110 may include a connection management unit 316, the neighbor BS 111 may include a connection management unit 317, the neighbor BS 112 may include a connection management unit 318, and the neighbor BS 113 may include a connection management unit 319. The connection management units 316, 317, 318, and 319 may manage wireless connections, including managing handoff processes in the WWAN based on measurement reports received from the UEs (such as the UE 120), as further described herein.

In some implementations, when the UE 120 is connected to the serving BS 110, the UE 120 may receive measurement configuration messages from the serving BS 110. The measurement configuration messages may provide an indication of the neighbor BSs to the UE 120. In some implementations, when the UE 120 is operating in an idle mode, the serving BS 110 may periodically provide a SIB message to the UE 120 indicating the 5G NR neighbor BSs that are handoff candidates. For example, the SIB message may be a SIB24 message. The 5G NR neighbor BSs (which also may be referred to as SA 5G NR neighbor BSs or SA NR neighbor BSs) that are handoff candidates may be referred to as packet switched handoff (PSHO) candidates. In some implementations, the UE 120 also may store, maintain, and update handoff history DB information that may provide a history of handoffs with BSs. The handoff history DB information may include an NR acquisition DB information and an NR handoff history DB information. In some implementations, the UE 120 may access the NR acquisition DB information indicating all previous handoffs associated with the UE 120. For example, the NR acquisition DB information may include a list of previous handoffs to 5G NR neighbor BSs and previous handoffs to EN-DC neighbor BSs (which also may be referred to as dual connectivity neighbor BSs). In some implementations, the UE 120 may access the NR handoff history DB information indicating the previous handoffs associated with the UE 120 that were performed during a past handoff time period. As one non-limiting example, the past handoff time period may be configured to be the past 4 hours. As another non-limiting example, the past handoff time period may be configured to be the past 8 hours. The past handoff time period may be configured to be any amount of time, such as any number of minutes, hours, or days. The NR handoff history DB information may provide a list of previous handoffs to 5G NR neighbor BSs and previous handoffs to EN-DC neighbor BSs during the past handoff time period.

In some implementation, the UE 120 may classify the neighbor BSs (such as the neighbor BS 111, the neighbor BS 112, and the neighbor BS 113) as either a 5G NR neighbor BS or a dual connectivity neighbor BS based on one or more of the SIB message, the NR acquisition DB information, and the NR handoff history DB information. In some implementations, the UE 120 may access an RRC connection reconfiguration that provides a list of neighbor BSs that are handoff candidates. For example, the list of neighbor BSs that are handoff candidates may list the neighbor BS 111, the neighbor BS 112, and the neighbor BS 113. In some implementations, to begin classifying the neighbor BSs, the UE 120 may access the most recently received SIB24 message to determine which of the neighbor BSs are 5G NR neighbor BSs. For example, the most recently received SIB24 may indicate that the neighbor BS 112 is a 5G NR neighbor BS. In some implementations, the UE 120 may access at least one of the most recently stored version of the NR acquisition DB information and the most recently stored version of the NR handoff history DB information to confirm the neighbor BS 112 is a 5G NR neighbor BS and to determine the classification of the neighbor BS 111 and the neighbor BS 113. The most recent version of the NR acquisition DB information (stored at the UE 120) and the most recent version of the NR handoff history DB information (stored at the UE 120) may confirm that the neighbor BS 112 is a 5G NR neighbor BS, and also may indicate that the neighbor BS 111 and the neighbor BS 113 are dual connectivity neighbor BSs. For example, at least one of the NR acquisition DB information and the NR handoff history DB information may indicate that the neighbor BS 112 is a 5G NR neighbor BS based on the stored information associated with a past handoff involving the UE 120 and the neighbor BS 112. Also, at least one of the NR acquisition DB information and the NR handoff history DB information may indicate that the neighbor BS 111 and the neighbor BS 113 are dual connectivity neighbor BSs based on the stored information associated with a past handoff involving the UE 120 and the neighbor BS 111 and the stored information associated with a past handoff involving the UE 120 and the neighbor BS 113. After classifying the neighbor BSs, the UE 120 may use the neighbor BS classification to determine and perform a robust signal strength measurement procedure for the neighbor BSs.

In some implementations, based on the classification, the UE 120 may perform a signal strength measurement procedure for the 5G NR neighbor BSs. The UE 120 may perform a first signal strength measurement for the neighbor BS 112. The UE 120 may determine whether the first signal strength measurement meets a signal strength criteria. For example, the signal strength criteria may be a first signal strength threshold. If the first signal strength measurement meets the signal strength criteria, the neighbor BS 112 may be designated as a handoff candidate. In some implementations, if the first signal strength measurement meets the signal strength criteria and the neighbor BS 112 is designated as a handoff candidate, the UE 120 may determine to perform one or more additional signal strength measurements prior to the expiration of the TTT time period. The TTT time period may be configured by the serving BS 110 and provided to the UE 120 in the measurement configuration messages.

In some implementations, the UE 120 may determine a measurement time interval (Z) to perform the one or more additional signal strength measurements prior to the expiration of the TTT time period based on a duration (T) of the TTT time period and a number (N) of additional signal strength measurements. The duration (T) of the TTT time period is configured by the serving BS 110. In some implementations, the UE 120 may determine the number (N) of additional signal strength measurements based on whether the UE 120 is stationary or in motion. For example, the UE 120 may configure the number of additional signal strength measurements to be one additional signal strength measurement (N=1) in response to determining the UE 120 is stationary. As another example, the UE 120 may configure the number of additional signal strength measurements to be two or more additional signal strength measurements (N>1) in response to determining the UE 120 is in motion. The UE 120 may determine whether it is stationary or in motion based on one or more of location and positioning information (such as GPS information), sensor information (such as accelerometer information), and channel information (such as doppler spread information).

Figure 4:
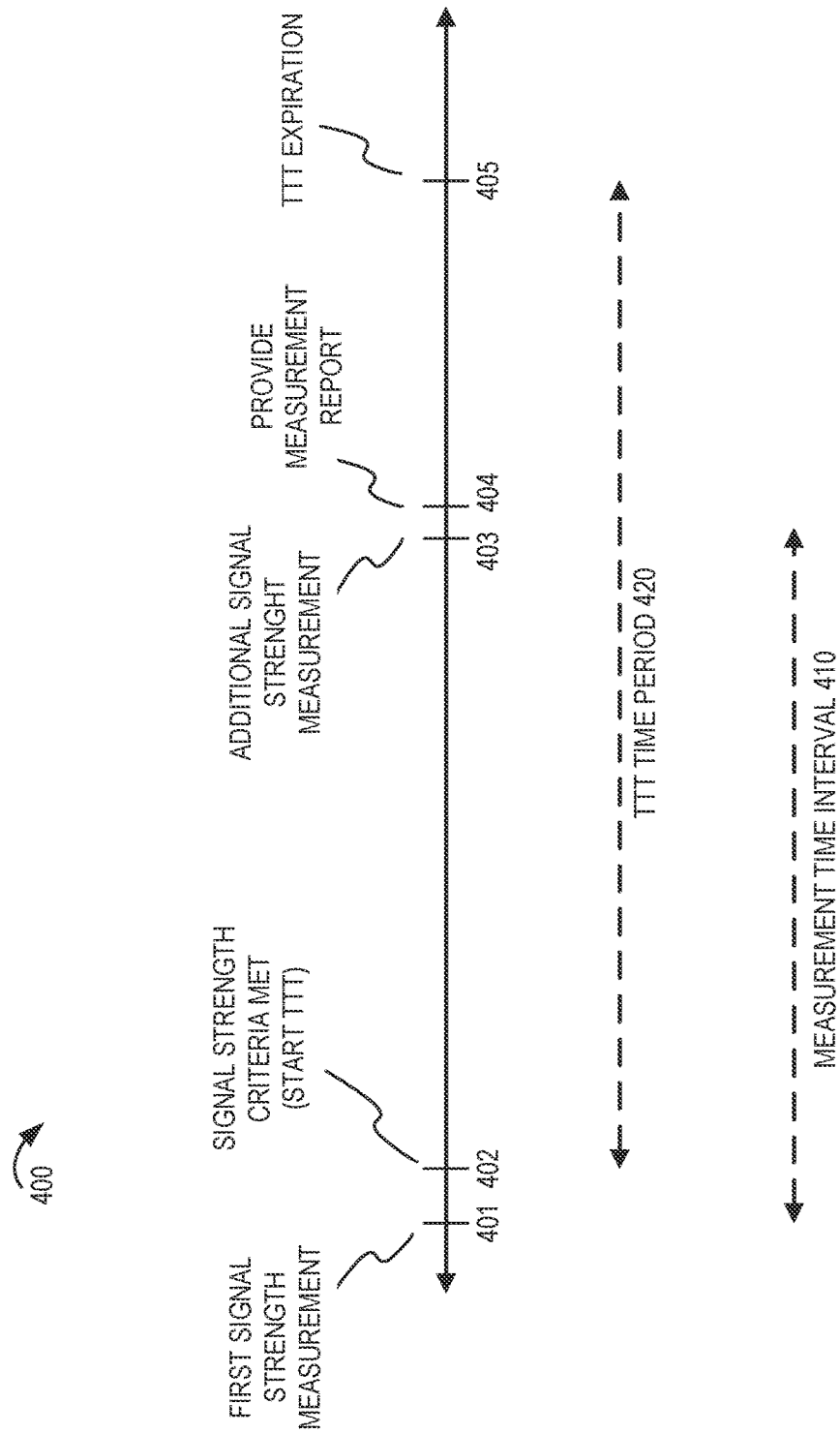
FIG. 4 shows an example timing diagram that shows how a robust measurement procedure may send a measurement report prior to the expiration of the TTT time period.

In some implementations, the UE 120 may determine a measurement time interval (Z) by dividing the duration (T) of the TTT time period by the number (N) of additional signal strength measurements plus 1 (Z=T/N+1). For example, when N=1, the measurement time interval (Z) may be T/2. When Z=T/2, the one additional signal strength measurement may be performed much earlier than the expiration of the TTT time period, as further described in FIG. 4. In some implementations, the UE 120 may provide a measurement report to the serving BS 110 after the one additional signal strength measurement and prior to the expiration of the TTT time period. The one additional signal strength measurement also may be referred to as the last signal strength measurement. Since the measurement report may be transmitted after the one additional (or last) signal strength measurement, the measurement report may be provided to the serving BS 110 much earlier than the expiration of the TTT time period, as shown in FIG. 4.

As another example, the UE 120 may configure the number of additional signal strength measurements to be two or more additional signal strength measurement (N>1) in response to determining the UE 120 is in motion. In some implementations, the UE 120 may determine the measurement time interval (Z) by dividing the duration (T) of the TTT time period by the number (N) of additional signal strength measurements plus 1 (Z=T/N+1). For example, when N=2, the measurement time interval (Z) may be T/3. When Z=T/3, each of the two additional signal strength measurements may be performed much earlier than the expiration of the TTT time period, as further described in FIG. 5. In some implementations, the UE 120 may provide a measurement report to the serving BS 110 after the second additional signal strength measurement and prior to the expiration of the TTT time period. The second additional signal strength measurement also may be referred to as the last signal strength measurement. Since the measurement report may be transmitted after the second additional (or last) signal strength measurement, the measurement report may be provided to the serving BS 110 much earlier than the expiration of the TTT time period, as shown in FIG. 5.

In some implementations, the measurement report that is transmitted to the serving BS 110 may include the last signal strength measurement of the one or more additional signal strength measurements that was taken by the UE 120. Also, the measurement report may be transmitted to the serving BS 110 after the last signal strength measurement and prior to the expiration of the TTT time period. By implementing the robust measurement procedure described herein, the serving BS 110 may receive current signal strength measurements that are not stale, and thus the serving BS 110 can make a handover decision based on current and reliable measurements.

In some implementations, the UE 120 may prioritize handoffs to 5G NR neighbor BSs or handoffs to dual connectivity neighbor BSs depending on a comparison of the initial or first signal strength measurement to one or more signal strength thresholds. For example, after classification of the neighbor BSs, the UE 120 may identify a 5G NR neighbor BS (such as the neighbor BS 112) and a dual connectivity neighbor BS (such as the neighbor BS 111). The UE 120 may perform the initial or first signal strength measurement for the neighbor BS 112, and may perform a signal strength measurement for the serving BS 110. In some implementations, if the signal strength measurement associated with the serving BS 110 is less than a first signal strength threshold, the UE 120 may prioritize measurements associated with the neighbor BS 112 (the 5G NR neighbor BS, which also may be referred to as an NR PSHO neighbor BS). For example, the UE 120 may prioritize measurements associated with the neighbor BS 112 by performing one or more additional signal strength measurements for the neighbor BS 112 prior to performing an additional signal strength measurement for the neighbor BS 111. The UE 120 may prioritize the handoff to the neighbor BS 112 by prioritizing the measurements associated with the neighbor BS 112 ahead of the measurements associated with the neighbor BS 111. In some implementations, if the signal strength measurement associated with the serving BS 110 is less than the first signal strength threshold, the UE 120 may perform measurements more often for the neighbor BS 112 than for the neighbor BS 111. For example, the UE 120 may trigger measurement periods associated with a TTT time period for the neighbor BS 112 more often than measurement periods for the neighbor BS 111. Thus, the UE 120 may transmit measurement reports associated with the neighbor BS 112 more often than measurement reports for the neighbor BS 111.

In some implementations, if the signal strength measurement associated with the serving BS 110 is greater than or equal to the first signal strength threshold and the initial or first signal strength measurement associated with the neighbor BS 112 is less than a second signal strength threshold, the UE 120 may prioritize measurements associated with the neighbor BS 111 (the dual connectivity neighbor BS, which also may be referred to as non-PSHO neighbor BS). For example, the UE 120 may prioritize measurements associated with the neighbor BS 111 by performing the additional signal strength measurements for the neighbor BS 111 prior to performing one or more additional signal strength measurement for the neighbor BS 112. The UE 120 may prioritize the handoff to the neighbor BS 111 by prioritizing the measurements associated with the neighbor BS 111 ahead of the measurements associated with the neighbor BS 112. In some implementations, if the signal strength measurement associated with the serving BS 110 is greater than or equal to the first signal strength threshold and the initial or first signal strength measurement associated with the neighbor BS 112 is less than a second signal strength threshold, the UE 120 may perform measurements more often for the neighbor BS 111 than for the neighbor BS 112. For example, the UE 120 may trigger measurement periods associated with a TTT time period for the neighbor BS 111 more often than measurement periods for the neighbor BS 112. Thus, the UE 120 may transmit measurement reports associated with the neighbor BS 111 more often than measurement reports for the neighbor BS 112.

In some implementations, if the signal strength measurement associated with the neighbor BS 112 (the 5G NR neighbor BS) is greater than or equal to the second signal strength threshold, the UE 120 may prioritize measurements associated with the BS 112. For example, the UE 120 may prioritize measurements associated with the BS 112 by performing one or more additional signal strength measurements for the neighbor BS 112 prior to performing an additional signal strength measurement for the neighbor BS 111. The UE 120 also may transmit measurement reports associated with the neighbor BS 112 more often than measurement reports for the neighbor BS 111.

FIG. 4 shows an example timing diagram 400 that shows how a robust measurement procedure may send a measurement report prior to the expiration of the TTT time period.

A shown in FIG. 4, at 401, a UE (such as the UE 120 of FIG. 3) may perform a first signal strength measurement associated with a 5G NR neighbor BS (such as the neighbor BS 112), as described in FIG. 3. At 402, the UE may determine that the first signal strength measurement associated with the 5G NR neighbor BS meets the signal strength criteria. The TTT time period 420 also may start at 402. The TTT time period 420 may have a duration (T) that ends at the TTT expiration (at 405). After a measurement time interval 410, at 403, the UE may perform an additional signal strength measurement. After determining that the additional signal strength measurement meets the signals strength criteria, at 404, the UE may provide a measurement report to the serving BS (such as the serving BS 110 of FIG. 3).

In some implementations, if a default measurement time interval 410 is less than the TTT time period 420, the UE may utilize the default measurement time interval 410 and may transmit the measurement report after the additional signal strength measurement (at 403). Since the default measurement time interval 410 is less than the TTT time period 420, the UE may transmit the measurement report (at 404) prior to the expiration of the TTT time period 420. Typically, in traditional measurement procedures, the UE may wait to transmit the measurement report until after the TTT time period 420 expires, which may result in the serving BS receiving stale measurements.

In some implementations, as described in FIG. 3, the UE may determine the measurement time interval 410 based on whether the UE is stationary or in motion. For example, when the UE is stationary, the UE may perform one additional signal strength measurement (N=1) and may determine the measurement time interval 410 by dividing the duration (T) of the TTT time period 420 by N+1. For example, the measurement time interval 410 may be equal to T/2. Since the default measurement time interval 410 is less than the TTT time period 420, the UE may transmit the measurement report prior to the expiration of the TTT time period 420.

FIG. 5 shows an example timing diagram 500 that shows how a robust measurement procedure may send a measurement report prior to the expiration of the TTT time period.

A shown in FIG. 5, at 501, a UE (such as the UE 120 of FIG. 3) may perform a first signal strength measurement associated with a 5G NR neighbor BS (such as the neighbor BS 112), as described in FIG. 3. At 502, the UE may determine that the first signal strength measurement associated with the 5G NR neighbor BS meets the signal strength criteria. The TTT time period 520 also may start at 502. The TTT time period 520 may have a duration (T) that ends at the TTT expiration (at 506). In some implementations, as described in FIG. 3, the UE may determine the measurement time interval 510 based on whether the UE is stationary or in motion. For example, when the UE is in motion, the UE may perform two or more additional signal strength measurements. For example, if the UE performs two additional signal strength measurements (N=2), the UE may determine the measurement time interval 510 by dividing the duration (T) of the TTT time period 520 by N+1. For example, the measurement time interval 510 may be equal to T/3. As shown in FIG. 5, the UE may perform a first additional signal strength measurement (at 503) after a first instance of the measurement time interval 510. If the first additional signal strength measurement meets the signal strength criteria, the UE may perform a second additional signal strength measurement (at 504) after a second instance of the measurement time interval 510. The second additional signal strength measurement also may be referred to as the last signal strength measurement. If the second additional signal strength measurement meets the signal strength criteria, the UE may provide a measurement report (at 505) to the serving BS prior to the expiration of the TTT time period 520. Since the total duration of the first two instances of the measurement time interval 510 is less than the TTT time period 520, the UE may transmit the measurement report after the last signal strength measurement and prior to the expiration of the TTT time period 520. Typically, in traditional measurement procedures, the UE may wait to transmit the measurement report until after the TTT time period 520 expires, which may result in the serving BS receiving stale measurements.

FIG. 6 shows an example message flow 600 that shows a UE that is configured to implement a robust measurement procedure for performing handoffs. The message flow diagram 600 includes the UE 120, the serving BS 110, and the neighbor BS 112 that are described in FIG. 3.

At 610, the serving BS 110 may provide measurement configuration messages to the UE 120. The measurement configuration messages may include a SIB message, such as a SIB24 message. In some implementations, the serving BS 110 may periodically provide the SIB message to the UE 120 indicating the 5G NR neighbor BSs that are handoff candidates.

At 620, the UE 120 may receive and process the measurement configuration messages and may access handoff history DB information. For example, the UE 120 may receive and process a SIB message (such as a SIB24 message). In some implementations, the UE 120 also may store, maintain, and update handoff history DB information, such as NR acquisition DB information and NR handoff history DB information. In some implementations, the UE 120 may access the NR acquisition DB information indicating all previous handoffs associated with the UE 120. For example, the NR acquisition DB information may provide a list of previous handoffs to 5G NR neighbor BSs and previous handoffs to dual connectivity neighbor BSs. In some implementations, the serving BS 110 may access the NR handoff history DB information indicating the previous handoffs associated with the UE 120 that were performed during a past handoff time period. The past handoff time period may be configured by the serving BS 110 or by the UE 120, as described in FIG. 3. The UE 120 may classify neighbor BSs as either 5G NR neighbor BSs or dual connectivity neighbor BSs (such as EN-DC neighbor BSs) based on one or more of the measurement configuration messages (such as a SIB message(s)) and the handoff history DB information. In some implementations, the UE 120 may classify the neighbor BSs that are indicated by an RRC connection reconfiguration. As described in FIG. 3, the UE 120 may classify the neighbor BS 112 as a 5G NR neighbor BS. Although not shown, the UE 120 also may classify other neighbor BSs as dual connectivity neighbor BSs (such as neighbor BS 111 and neighbor BS 113 of FIG. 3).

At 630, the neighbor BS 112 may transmit a reference signal to the WWAN. For example, the reference signal may be an SSB or a CSI-RS.

At 640, the UE 120 may receive the reference signal and may perform the initial or first signal strength measurement associated with the neighbor BS 112 based on the reference signal. The UE 120 may determine that the first signal strength measurement meets the signal strength criteria configured by the serving BS 110. The UE 120 may determine whether to perform one or more additional signal strength measurements. For example, as described in FIG. 3, the UE 120 may determine whether to perform one or more additional signal strength measurements based on whether the UE 120 is stationary or in motion.

At 650, the neighbor BS 112 may transmit one or more additional reference signals to the WWAN.

At 660, the UE 120 may receive the one or more additional reference signal and may perform the one or more additional signal strength measurements. The UE 120 may determine whether each of the one or more additional signal strength measurements meets the signal strength criteria. If each of the one or more additional signal strength measurements meets the signal strength criteria, the UE 120 may transmit a measurement report after the last signal strength measurement. For example, if the UE 120 performed two additional signal strength measurements and both additional signal strength measurements met the signal strength criteria, the UE 120 may determine to transmit a measurement report to the serving BS 110 after the second additional signal strength measurement and prior to the expiration of a TTT time period.

At 670, the UE 120 may transmit the measurement report to the serving BS 110 after the second additional signal strength measurement and prior to the expiration of the TTT time period. The measurement report may include the last measurement that met the signal strength criteria.

At 680, the serving BS 110 may receive the measurement report and may determine to initiate a handoff of the UE 120 from the serving BS 110 to the neighbor BS 112.

At 690, the serving BS 110 may provide a handoff request message to the neighbor BS 112 to initiate the handoff of the UE 120 from the serving BS 110 to the neighbor BS 112.

FIG. 7 shows an example flow diagram of the UE implementing a robust measurement procedure for neighbor BSs that are identified as handoff candidates.

At block 710, the apparatus of the UE may designate a first 5G NR neighbor BS as a handoff candidate for the UE based, at least in part, on a first signal strength measurement.

At block 720, the apparatus of the UE may configure a measurement time interval to perform one or more additional signal strength measurements prior to expiration of a TTT time period. The TTT time period may be configured by a serving BS.

At block 730, the apparatus of the UE may output a measurement report for transmission to the serving BS prior to expiration of the TTT time period.

Figure 8:
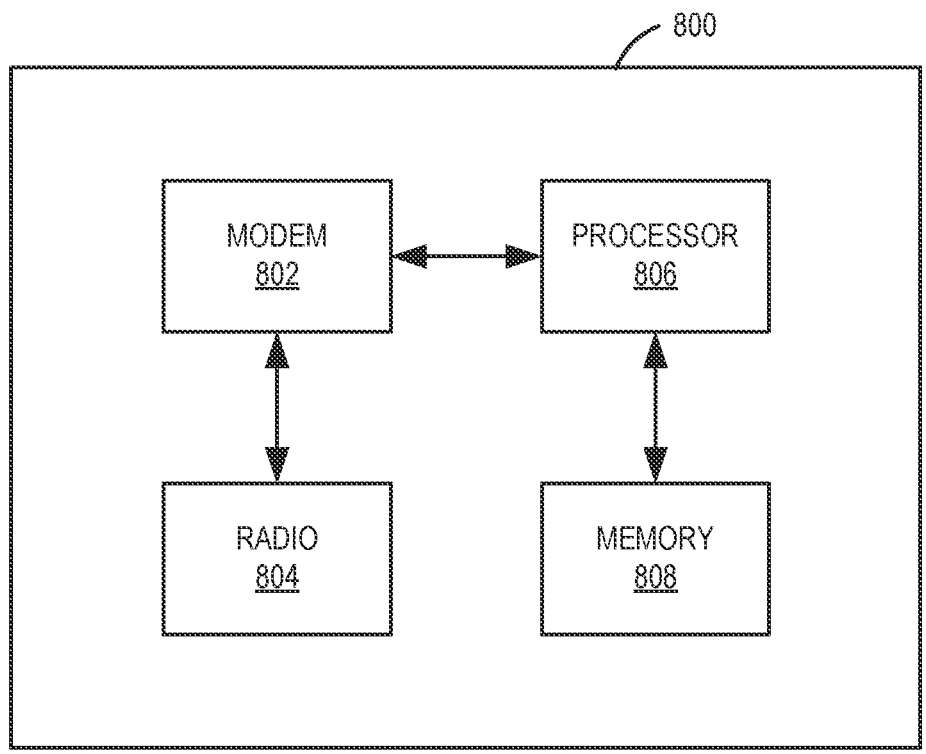
FIG. 8 shows a block diagram of an example wireless communication apparatus.

FIG. 8 shows a block diagram of an example wireless communication apparatus 800. In some implementations, the wireless communication apparatus 800 can be an example of a device for use in a UE, such as the UE 120 described with reference to FIG. 3. In some implementations, the wireless communication apparatus 800 can be an example of a device for use in a BS, such as the BS 110 described with reference to FIG. 3. The wireless communication apparatus 800 is capable of transmitting (or outputting for transmission) and receiving wireless communications.

The wireless communication apparatus 800 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 800 may include one or more modems 802. In some implementations, the one or more modems 802 (collectively "the modem 802") may include a WWAN modem (for example, a 3GPP 4G LTE or 5G compliant modem). In some implementations, the wireless communication apparatus 800 also includes one or more radios 804 (collectively "the radio 804"). In some implementations, the wireless communication apparatus 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are mapped to points in a modulation constellation (using a selected MCS) to provide modulated symbols. The modulated symbols may be mapped to a number NS S of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 800 can include, or be coupled with, multiple transmit antennas (each with a corresponding transmit chain) and multiple receive antennas (each with a corresponding receive chain). The symbols output from the modem 802 are provided to the radio 804, which transmits the symbols via the coupled antennas. Similarly, symbols received via the antennas are obtained by the radio 804, which provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. In some implementations, the processor 806 may generally control the modem 802 to cause the modem to perform various operations described throughout.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 806 and the memory 808 of the wireless communication device 800 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 806, the memory 808, and one or more other components of the wireless communication device 800, such as the modem 802.

In some implementations, the processing system of a UE 120 may interface with other components of the UE 120, and may process information received from other components (such as inputs or signals), output information to other components, etc. For example, a chip or modem of the UE 120 (such as the wireless communication device 800) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication device 800) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 9:
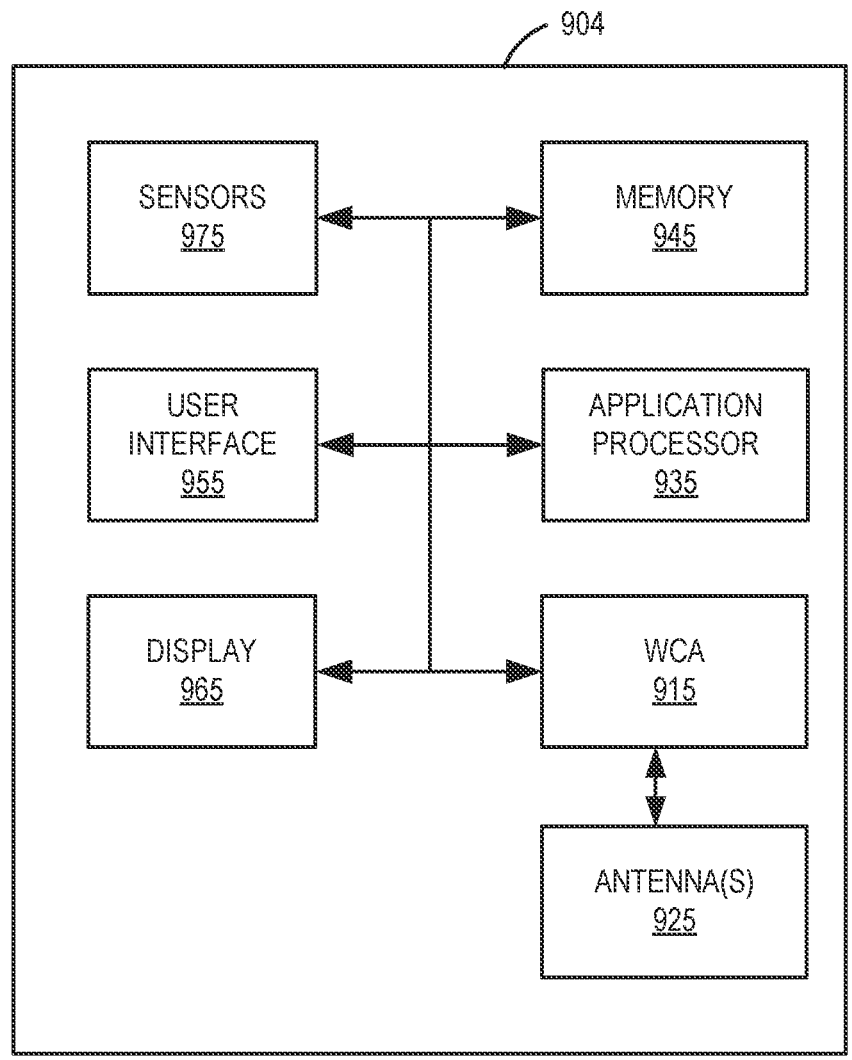
FIG. 9 shows a block diagram of an example mobile communication device.

FIG. 9 shows a block diagram of an example mobile communication device 904. For example, the mobile communication device 904 can be an example implementation of the UE 120 described herein. The mobile communication device 904 includes a wireless communication apparatus (WCA) 915. For example, the WCA 915 may be an example implementation of the wireless communication apparatus 800 described with reference to FIG. 8. The mobile communication device 904 also includes one or more antennas 925 coupled with the WCA 915 to transmit and receive wireless communications. The mobile communication device 904 additionally includes an application processor 935 coupled with the WCA 915, and a memory 945 coupled with the application processor 935. In some implementations, the mobile communication device 904 further includes a UI 955 (such as a touchscreen or keypad) and a display 965, which may be integrated with the UI 955 to form a touchscreen display. In some implementations, the mobile communication device 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 904 further includes a housing that encompasses the WCA 915, the application processor 935, the memory 945, and at least portions of the antennas 925, UI 955, and display 965.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

One innovative aspect of the subject matter described in this disclosure can be implemented in a method for wireless communication performed by an apparatus of a UE. The method may include designating a first 5G NR neighbor BS as a handoff candidate for the UE based, at least in part, on a first signal strength measurement, and configuring a measurement time interval to perform one or more additional signal strength measurements prior to expiration of a TTT time period. The TTT time period may be configured by a serving BS. The method may include outputting a measurement report for transmission to the serving BS prior to expiration of the TTT time period.

In some implementations, the method may include determining the measurement time interval to perform the one or more additional signal strength measurements prior to expiration of the TTT time period based, at least in part, on a duration of the TTT time period and a number of additional signal strength measurements.

In some implementations, the method may include determining the number of additional signal strength measurements based, at least in part, on whether the UE is stationary or the UE is in motion.

In some implementations, the method may include configuring the number of additional signal strength measurements to one additional signal strength measurement in response to determining the UE is stationary. The method may include configuring the number of additional signal strength measurements to two or more additional signal strength measurements in response to determining the UE is in motion.

In some implementations, the method of outputting the measurement report for transmission to the serving BS prior to expiration of the TTT time period may include performing a last signal strength measurement of the one or more additional signal strength measurements and outputting the measurement report for transmission to the serving BS after performing the last signal strength measurement and prior to expiration of the TTT time period.

In some implementations, the method may include classifying each of a plurality of neighbor BSs as either a 5G NR neighbor BS or a dual connectivity neighbor BS based, at least in part, on one or more of NR acquisition database information, a SIB message, and NR handoff history database information.

In some implementations, after classifying each of the plurality of neighbor BSs, the method may include identifying the first 5G NR neighbor BS from the plurality of neighbor BSs, performing the first signal strength measurement to determine whether the first 5G NR neighbor BS meets a signal strength criteria, and designating the first 5G NR neighbor BS as a handoff candidate for the UE in response to determining the first signal strength measurement associated with the first 5G NR neighbor BS meets the signal strength criteria.

In some implementations, after classifying each of the plurality of neighbor BSs, the method may include identifying the first 5G NR neighbor BS and a first dual connectivity neighbor BS, performing the first signal strength measurement associated with the first 5G NR neighbor BS and a second signal strength measurement associated with the serving BS, and performing the one or more additional signal strength measurements for the first 5G NR neighbor BS prior to performing additional signal strength measurements for the first dual connectivity neighbor BS in response to determining the second signal strength measurement associated with the serving BS is less than a first signal strength threshold.

In some implementations, after classifying each of the plurality of neighbor BSs, the method may include identifying the first 5G NR neighbor BS and a first dual connectivity neighbor BS, performing the first signal strength measurement associated with the first 5G NR neighbor BS and a second signal strength measurement associated with the serving BS, and performing additional signal strength measurements for the first dual connectivity neighbor BS prior to performing the one or more additional signal strength measurements for the first 5G NR neighbor BS in response to determining the second signal strength measurement associated with the serving BS is greater than a first signal strength threshold and the first signal strength measurement associated with the first 5G NR neighbor BS is less than a second signal strength threshold.

In some implementations, the first 5G NR neighbor BS may be a SA 5G NR neighbor BS and the first dual connectivity neighbor BS may be an EN-DC neighbor BS.

In some implementations, the method may include determining the first signal strength measurement associated with the first 5G NR neighbor BS meets a signal strength criteria. The signal strength criteria may be configured by the serving BS. The method may include determining the one or more additional signal strength measurements associated with the first 5G NR neighbor BS meet the signal strength criteria. The measurement report may include an indication of a last signal strength measurement of the one or more additional signal strength measurements that met the signal strength criteria.

In some implementations, the signal strength criteria may be a first signal strength threshold.

Another innovative aspect of the subject matter described in this disclosure can be implemented as an apparatus of a UE for wireless communications. The apparatus may include one or more interfaces and one or more processors configured to perform any one of the above-mentioned methods or featured described herein.

Another innovative aspect of the subject matter described in this disclosure can be implemented as a non-transitory computer-readable medium having stored therein instructions which, when executed by one or more processors of a UE, cause the UE to perform any one of the above-mentioned methods or features described herein.

Another innovative aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by an apparatus of a user equipment (UE), comprising:

designating a first 5G New Radio (NR) neighbor base station (BS) as a handoff candidate for the UE in accordance with a first signal strength measurement, the UE designating the first 5G NR neighbor BS as the handoff candidate in accordance with NR acquisition database information, NR handoff history database information, a system information block (SIB) message, or any combination thereof;

configuring a measurement time interval to perform one or more additional signal strength measurements prior to expiration of a time to trigger (TTT) time period, the TTT time period being configured by a serving BS, the measurement time interval in accordance with a quantity of the one or more additional signal strength measurements, the quantity of the one or more additional signal strength measurements in accordance with a mobility of the UE; and outputting a measurement report for transmission to the serving BS prior to expiration of the TTT time period.

2. The method of claim 1, further comprising:
determining the measurement time interval to perform the one or more additional signal strength measurements prior to expiration of the TTT time period in accordance with:
 a duration of the TTT time period, and
 the quantity of the one or more additional signal strength measurements.

3. The method of claim 2, further comprising determining the quantity of the one or more additional signal strength measurements in accordance with whether the UE is stationary or the UE is in motion as the mobility of the UE.

4. The method of claim 2, further comprising:
configuring the quantity of the one or more additional signal strength measurements to one additional signal strength measurement in response to determining the UE is stationary; and
configuring the quantity of the one or more additional signal strength measurements to two or more additional signal strength measurements in response to determining the UE is in motion.

5. The method of claim 1, wherein outputting the measurement report for transmission to the serving BS prior to expiration of the TTT time period further comprises:
performing a last signal strength measurement of the one or more additional signal strength measurements; and
outputting the measurement report for transmission to the serving BS after performing the last signal strength measurement and prior to expiration of the TTT time period.

6. The method of claim 1, further comprising:
classifying each of a plurality of neighbor BSs as either a 5G NR neighbor BS or a dual connectivity neighbor BS in accordance with one or more of:
 the NR acquisition database information;
 the SIB message; and
 the NR handoff history database information.

7. The method of claim 6, further comprising:
after classifying each of the plurality of neighbor BSs,
 identifying the first 5G NR neighbor BS from the plurality of neighbor BSs;
 performing the first signal strength measurement to determine whether the first 5G NR neighbor BS meets a signal strength criteria; and
 designating the first 5G NR neighbor BS as the handoff candidate for the UE in response to determining the first signal strength measurement associated with the first 5G NR neighbor BS meets the signal strength criteria.

8. The method of claim 6, further comprising:
after classifying each of the plurality of neighbor BSs,
 identifying the first 5G NR neighbor BS and a first dual connectivity neighbor BS;
 performing the first signal strength measurement associated with the first 5G NR neighbor BS and a second signal strength measurement associated with the serving BS; and
 performing the one or more additional signal strength measurements for the first 5G NR neighbor BS prior to performing additional signal strength measurements for the first dual connectivity neighbor BS in response to determining the second signal strength measurement associated with the serving BS is less than a first signal strength threshold.

9. The method of claim 6, further comprising:
after classifying each of the plurality of neighbor BSs,
 identifying the first 5G NR neighbor BS and a first dual connectivity neighbor BS;
 performing the first signal strength measurement associated with the first 5G NR neighbor BS and a second signal strength measurement associated with the serving BS; and
 performing additional signal strength measurements for the first dual connectivity neighbor BS prior to performing the one or more additional signal strength measurements for the first 5G NR neighbor BS in response to determining the second signal strength measurement associated with the serving BS is greater than a first signal strength threshold and the first signal strength measurement associated with the first 5G NR neighbor BS is less than a second signal strength threshold.

10. The method of claim 6, wherein the 5G NR neighbor BS is a standalone (SA) 5G NR neighbor BS and the dual connectivity neighbor BS is an Evolved Universal Terrestrial Radio Access (E-UTRA) NR Dual Connectivity (EN-DC) neighbor BS.

11. The method of claim 1, further comprising:
determining the first signal strength measurement associated with the first 5G NR neighbor BS meets a signal strength criteria, the signal strength criteria being configured by the serving BS; and
determining the one or more additional signal strength measurements associated with the first 5G NR neighbor BS meet the signal strength criteria,
wherein the measurement report includes an indication of a last signal strength measurement of the one or more additional signal strength measurements that met the signal strength criteria.

12. The method of claim 11, wherein the signal strength criteria is a first signal strength threshold.

13. An apparatus of a user equipment (UE) for wireless communication, comprising:
a processing system that includes one or more processors and one or more memories coupled with the one or more processors, the processing system configured to cause the apparatus to:
 designate a first 5G New Radio (NR) neighbor base station (BS) as a handoff candidate for the UE in accordance with a first signal strength measurement, the UE designating the first 5G NR neighbor BS as the handoff candidate in accordance with NR acquisition database information, NR handoff history database information, a system information block (SIB) message, or any combination thereof;
configure a measurement time interval to perform one or more additional signal strength measurements prior to expiration of a time to trigger (TTT) time period, the TTT time period being configured by a serving BS, the measurement time interval in accordance with a quantity of the one or more additional signal strength measurements, the quantity of the one or more additional signal strength measurements in accordance with a mobility of the UE; and
one or more interfaces configured to output a measurement report for transmission to the serving BS prior to expiration of the TTT time period.

14. The apparatus of claim 13, wherein the processing system is further configured to cause the apparatus to:
determine the measurement time interval to perform the one or more additional signal strength measurements prior to expiration of the TTT time period in accordance with:
a duration of the TTT time period, and
the quantity of the one or more additional signal strength measurements.

15. The apparatus of claim 14, wherein the processing system is further configured to cause the apparatus to determine the quantity of the one or more additional signal strength measurements in accordance with whether the UE is stationary or the UE is in motion as the mobility of the UE.

16. The apparatus of claim 14, wherein the processing system is further configured to:
configure the quantity of the one or more additional signal strength measurements to one additional signal strength measurement in response to a determination that the UE is stationary; and
configure the quantity of the one or more additional signal strength measurements to two or more additional signal strength measurements in response to a determination that the UE is in motion.

17. The apparatus of claim 13, wherein:
the processing system is further configured to cause the apparatus to perform a last signal strength measurement of the one or more additional signal strength measurements; and
the one or more interfaces are further configured to output the measurement report for transmission to the serving BS after performing the last signal strength measurement and prior to expiration of the TTT time period.

18. The apparatus of claim 13, wherein the processing system is further configured to cause the apparatus to:
classify each of a plurality of neighbor BSs as either a 5G NR neighbor BS or a dual connectivity neighbor BS in accordance with one or more of:
the NR acquisition database information;
the SIB message; and
the NR handoff history database information.

19. The apparatus of claim 18, wherein, after classification of each of the plurality of neighbor BSs, the processing system is further configured to cause the apparatus to:
identify the first 5G NR neighbor BS from the plurality of neighbor BSs;
perform the first signal strength measurement to determine whether the first 5G NR neighbor BS meets a signal strength criteria; and
designate the first 5G NR neighbor BS as the handoff candidate for the UE in response to determining the first signal strength measurement associated with the first 5G NR neighbor BS meets the signal strength criteria.

20. The apparatus of claim 18, wherein, after classification of each of the plurality of neighbor BSs, the processing system is further configured to cause the apparatus to:
identify the first 5G NR neighbor BS and a first dual connectivity neighbor BS;
perform the first signal strength measurement associated with the first 5G NR neighbor BS and a second signal strength measurement associated with the serving BS; and
perform the one or more additional signal strength measurements for the first 5G NR neighbor BS prior to performing additional signal strength measurements for the first dual connectivity neighbor BS in response to a determination that the second signal strength measurement associated with the serving BS is less than a first signal strength threshold.

21. The apparatus of claim 18, wherein, after classification of each of the plurality of neighbor BSs, the processing system is further configured to cause the apparatus to:
identify the first 5G NR neighbor BS and a first dual connectivity neighbor BS;
perform the first signal strength measurement associated with the first 5G NR neighbor BS and a second signal strength measurement associated with the serving BS; and
perform additional signal strength measurements for the first dual connectivity neighbor BS prior to performing the one or more additional signal strength measurements for the first 5G NR neighbor BS in response to a determination that the second signal strength measurement associated with the serving BS is greater than a first signal strength threshold and that the first signal strength measurement associated with the first 5G NR neighbor BS is less than a second signal strength threshold.

22. The apparatus of claim 18, wherein the 5G NR neighbor BS is a standalone (SA) 5G NR neighbor BS and the dual connectivity neighbor BS is an Evolved Universal Terrestrial Radio Access (E-UTRA) NR Dual Connectivity (EN-DC) neighbor BS.

23. The apparatus of claim 13, wherein the processing system is further configured to cause the apparatus to:
determine the first signal strength measurement associated with the first 5G NR neighbor BS meets a signal strength criteria, the signal strength criteria being configured by the serving BS; and
determine the one or more additional signal strength measurements associated with the first 5G NR neighbor BS meet the signal strength criteria,
wherein the measurement report includes an indication of a last signal strength measurement of the one or more additional signal strength measurements that met the signal strength criteria.

24. A non-transitory computer-readable medium having stored therein instructions which, when executed by one or more processors of a user equipment (UE), cause the UE to:
designate a first 5G New Radio (NR) neighbor base station (BS) as a handoff candidate for the UE in accordance with a first signal strength measurement, the UE designating the first 5G NR neighbor BS as the handoff candidate in accordance with NR acquisition database information, NR handoff history database information, a system information block (SIB) message, or any combination thereof;

configure a measurement time interval to perform one or more additional signal strength measurements prior to expiration of a time to trigger (TTT) time period, the TTT time period being configured by a serving BS, the measurement time interval in accordance with a quantity of the one or more additional signal strength measurements, the quantity of the one or more additional signal strength measurements in accordance with a mobility of the UE; and output a measurement report for transmission to the serving BS prior to expiration of the TTT time period.

25. The non-transitory computer-readable medium of claim 24, wherein the instructions, when executed by the one or more processors of the UE, further cause the UE to:
determine the measurement time interval to perform the one or more additional signal strength measurements prior to expiration of the TTT time period in accordance with:
a duration of the TTT time period, and
the quantity of the one or more additional signal strength measurements.

26. The non-transitory computer-readable medium of claim 25, wherein the instructions, when executed by the one or more processors of the UE, further cause the UE to determine the quantity of the one or more additional signal strength measurements in accordance with whether the UE is stationary or the UE is in motion as the mobility of the UE.

27. The non-transitory computer-readable medium of claim 24, wherein the instructions, when executed by the one or more processors of the UE, further cause the UE to:
perform a last signal strength measurement of the one or more additional signal strength measurements; and
output the measurement report for transmission to the serving BS after performing the last signal strength measurement and prior to expiration of the TTT time period.

28. An apparatus of a user equipment (UE) for wireless communication, comprising:
means for designating a first 5G New Radio (NR) neighbor base station (BS) as a handoff candidate for the UE in accordance with a first signal strength measurement, the means for the UE designating the first 5G NR neighbor BS as the handoff candidate in accordance with NR acquisition database information, NR handoff history database information, a system information block (SIB) message, or any combination thereof;
means for configuring a measurement time interval to perform one or more additional signal strength measurements prior to expiration of a time to trigger (TTT) time period, the TTT time period being configured by a serving BS, the measurement time interval in accordance with a quantity of the one or more additional signal strength measurements, the quantity of the one or more additional signal strength measurements in accordance with a mobility of the UE; and
means for outputting a measurement report for transmission to the serving BS prior to expiration of the TTT time period.

29. The apparatus of claim 28, further comprising:
means for determining the measurement time interval to perform the one or more additional signal strength measurements prior to expiration of the TTT time period in accordance with:
a duration of the TTT time period, and
the quantity of the one or more additional signal strength measurements.

30. The apparatus of claim 29, further comprising:
means for determining the quantity of the one or more additional signal strength measurements in accordance with whether the UE is stationary or the UE is in motion as the mobility of the UE.

* * * * *